US009150809B2

(12) United States Patent
Kawamura

(10) Patent No.: US 9,150,809 B2
(45) Date of Patent: Oct. 6, 2015

(54) THICKENER, GREASE, METHOD FOR PRODUCING THE SAME, AND GREASE-PACKED BEARING

(75) Inventor: Takayuki Kawamura, Mie (JP)

(73) Assignee: NTN CORPORATION, Osaka (JP)

( * ) Notice: Subject to any disclaimer, the term of this patent is extended or adjusted under 35 U.S.C. 154(b) by 345 days.

(21) Appl. No.: 13/579,686

(22) PCT Filed: Feb. 18, 2011

(86) PCT No.: PCT/JP2011/053445
§ 371 (c)(1),
(2), (4) Date: Aug. 17, 2012

(87) PCT Pub. No.: WO2011/102441
PCT Pub. Date: Aug. 25, 2011

(65) Prior Publication Data
US 2012/0316091 A1  Dec. 13, 2012

(30) Foreign Application Priority Data

Feb. 18, 2010 (JP) .................. 2010-033959
Apr. 21, 2010 (JP) .................. 2010-098218

(51) Int. Cl.
*C10M 119/24* (2006.01)
*C10M 115/08* (2006.01)
*F16C 33/66* (2006.01)

(52) U.S. Cl.
CPC ........... *C10M 119/24* (2013.01); *C10M 115/08* (2013.01); *F16C 33/6633* (2013.01); C10M2203/1006 (2013.01); C10M 2205/0285 (2013.01); C10M 2207/0406 (2013.01); C10M 2207/2805 (2013.01); C10M 2215/1026 (2013.01); C10M 2217/0456 (2013.01); C10N 2220/022 (2013.01); C10N 2220/04 (2013.01); C10N 2230/08 (2013.01); C10N 2240/02 (2013.01); C10N 2250/10 (2013.01)

(58) Field of Classification Search
USPC .................................. 508/100, 288, 290, 291
See application file for complete search history.

(56) References Cited

U.S. PATENT DOCUMENTS

| 3,025,241 A | * | 3/1962 | Dreher et al. | .................. 508/288 |
| 3,078,228 A | * | 2/1963 | Smith et al. | .................... 508/288 |
| 3,752,765 A | | 8/1973 | Birke | |
| 3,867,399 A | | 2/1975 | Birke | |
| 5,877,129 A | * | 3/1999 | Yatsuzuka et al. | ............ 508/156 |

FOREIGN PATENT DOCUMENTS

| CN | 1131183 A | 9/1996 |
|---|---|---|
| DE | 2238302 A1 | 2/1973 |
| EP | 0718394 A2 | 6/1996 |
| FR | 2149875 A5 | 3/1973 |
| GB | 1403570 A | 8/1975 |
| JP | 48-26762 A | 4/1973 |
| JP | 54-113605 A | 9/1979 |
| JP | 54-114506 A | 9/1979 |
| JP | 56-139592 A | 10/1981 |
| JP | 57-073086 A | 5/1982 |
| JP | 57-109896 A | 7/1982 |
| JP | 57109896 A * | 7/1982 |
| JP | 07-300459 A | 11/1995 |
| JP | 08-176104 A | 7/1996 |
| JP | 08-225793 A | 9/1996 |
| JP | 09-208982 A | 8/1997 |
| JP | 11-270566 A | 10/1999 |
| JP | 2000-104086 A | 4/2000 |
| JP | 2001-107073 A | 4/2001 |
| JP | 2008-239962 A | 10/2008 |

OTHER PUBLICATIONS

International Search Report Dated Apr. 26, 2011.

* cited by examiner

*Primary Examiner* — James Goloboy
(74) *Attorney, Agent, or Firm* — Hedman & Costigan, P.C.; James V. Costigan; Kathleen A. Costigan

(57) ABSTRACT

The present invention provides a thickener which allows grease having an excellent durability in a high-temperature and high-speed condition to be produced, the grease containing the thickener, a method of producing the thickener and the grease, and a grease-packed bearing. A grease (7) to be packed in a bearing (1) is obtained by adding a thickener for a grease comprising a compound shown by a chemical formula (1) shown below or a compound shown by a chemical formula (2) shown below;

[Chemical formula 1]

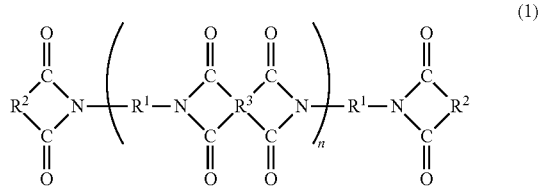
(1)

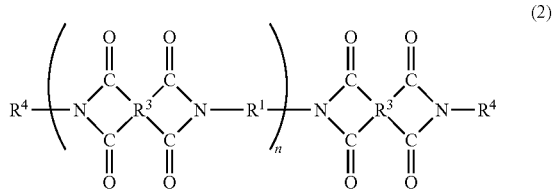
(2)

In the chemical formula (1) or the chemical formula (2), $R^1$ shows a diamine residue or a diisocyanate residue; $R^2$ shows a residue of a dicarboxylic acid in which two adjacent carbon atoms form an imide ring or residues of derivative of the dicarboxylic acid; $R^3$ shows a tetracarboxylic acid residue or residues of derivatives of the tetracarboxylic acid; $R^4$ shows a hydrogen atom residue, a monoamine residue or a monoisocyanate residue; and n indicates integers of 0 through 5.

19 Claims, 1 Drawing Sheet

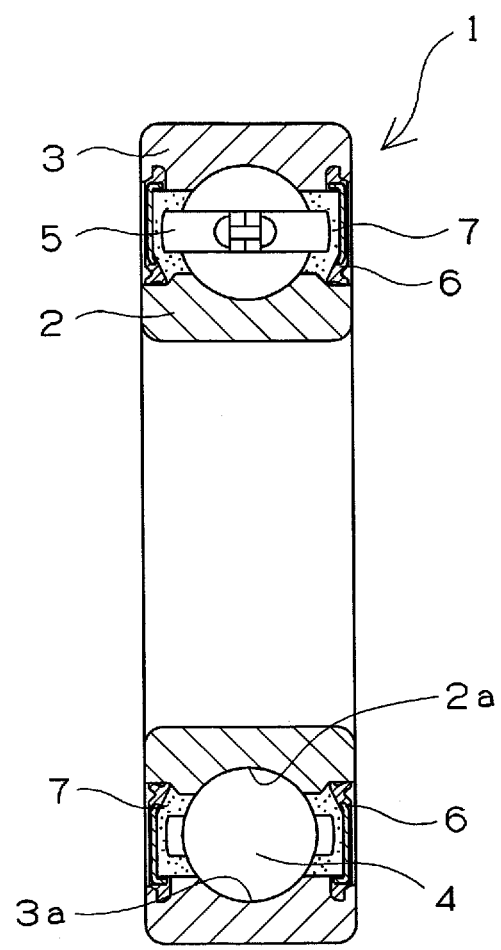

THICKENER, GREASE, METHOD FOR PRODUCING THE SAME, AND GREASE-PACKED BEARING

TECHNICAL FIELD

The present invention relates to a novel thickener, grease containing the thickener, a method of producing the thickener and the grease, and a grease-packed bearing. More particularly, the present invention relates to grease to be used by packing it in a rolling bearing which are used at a high temperature and a high speed for home electric appliances, industrial equipments, electric auxiliary machines which are used in an engine room of a car, and the like and relates to the grease-packed bearing.

BACKGROUND ART

The grease is packed inside rolling bearings to be incorporated in various electric auxiliary machines, industrial equipments, and the like to impart lubricity thereto. The grease is obtained by kneading a base oil, a thickener, and additives to be added to the base oil as necessary. As the base oil, a synthetic lubricating oil such as a mineral oil, an ester oil, a silicone oil, and an ether oil is generally used. As the thickener, a metal soap such as lithium soap and urea-based compounds are generally used. As the additive, an antioxidant, a rust proof agent, a metal deactivator, a viscosity index improver, and the like are added to the base oil as necessary.

With high performance of the home electric appliances, industrial equipments, and the electric auxiliary machines developed in recent years, rolling bearings for use in motors thereof are used in conditions where they are rotated at a high speed at a high temperature. Thus the rolling bearings are demanded to be excellent in durability at high temperatures and high speeds. The rolling bearings are also demanded to have quietness.

As grease, to be packed inside a bearing, which displays a good lubricity in a wide temperature range from a low temperature to a high temperature, restrains the bearing from generating an abnormal noise when it is cold, and is excellent in durability at a high temperature for a long time, the grease composed of the base oil consisting of the synthetic hydrocarbon oil and the predetermined ester oil and the urea-based thickener added to the base oil is known (see patent document 1). As grease which is used for a bearing for a pulley of a car to restrain the generation of brittleness-caused peeling from occurring on the raceway surface of the bearing and the surface of a ball and the generation of an abnormal noise when it is cold, the grease composed of the base oil, consisting of the synthetic hydrocarbon oil and the ester oil, which has the predetermined viscosity and the alicyclic diurea compound, serving as the thickener, which is added to the base oil is known (see patent document 2). As grease for allowing a bearing to have a life before the bearing is seized in the high-temperature and high-speed rotation condition, the grease composed of the base oil containing the ester oil and 3 to 30 wt % of the predetermined diurea compound as its thickener is known (see patent document 3).

As shown in the patent documents 1 through 3, as the grease excellent in its durability at a high temperature, the greases in which the diurea compound is used as the thickener are known. The diurea compounds used in these patent documents are obtained by a reaction between diphenylmethane diisocyanate and monoamine.

But even the lubricating compositions, shown in these patent documents, which are composed of the base oil containing the ester oil and the synthetic hydrocarbon oil and the diurea compound used as the thickener thereof have a problem that the lubricating compositions do not necessarily satisfy the performance demanded in recent years for the bearing for use in the home electric appliances, the industrial equipments, and the like such as the durability thereof in the high-temperature and high-speed rotation condition when the lubricating compositions are packed in the bearing.

In addition, as lubricating grease for use in a high temperature and a high load, the lubricating grease containing the compound, serving as the thickener thereof, which has two cyclic imide bonds essentially present in one molecule and two urea bonds, urethane bonds or amide bonds is known (see patent document 4).

It is essential for the compound containing the imide bond to have the combination of the imide bond with the urea bond, the urethane bond or the amide bond. The heat resistance of the urea bond, the urethane bond, and the amide bond is inferior to that of the imide bond as understood from the comparison between the polyimide resin and polyurethane resin or polyamide resin. Therefore even the thickener described in the patent document 4 has a problem that it is incapable of satisfying the durability in the high-temperature and high-speed condition demanded in recent years.

PRIOR ART DOCUMENT

Patent Document

Patent document 1: Japanese Patent Application Laid-Open No. 9-208982
Patent document 2: Japanese Patent Application Laid-Open No. 11-270566
Patent document 3: Japanese Patent Application Laid-Open No. 2001-107073
Patent document 4: Japanese Patent Application Laid-Open No. 54-114506

SUMMARY OF THE INVENTION

Problems to be Solved by the Invention

The present invention has been made to deal with the above-described problems. It is an object of the present invention to provide a thickener which allows grease having an excellent durability in a high-temperature and high-speed condition to be produced, the grease containing the thickener, a method of producing the thickener and the grease, and a grease-packed bearing.

Means for Solving the Problems

The thickener of the present invention is added to a grease. The thickener for a grease comprising a compound shown by a chemical formula (1) shown below or a compound shown by a chemical formula (2) shown below.

[Chemical formula 1]

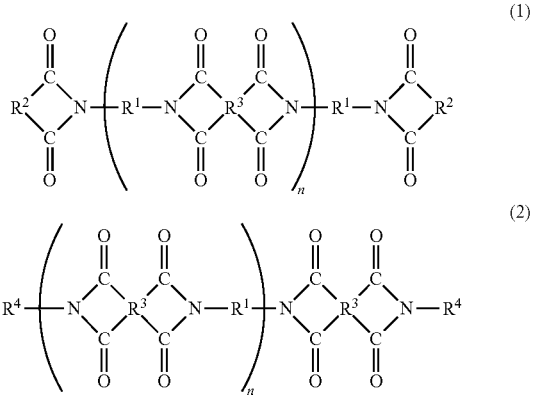

In the chemical formula (1) or the chemical formula (2), $R^1$ shows a diamine residue or a diisocyanate residue; $R^2$ shows a residue of a dicarboxylic acid in which two adjacent carbon atoms form an imide ring or residues of derivative of the dicarboxylic acid; $R^3$ shows a tetracarboxylic acid residue or residues of derivatives of the tetracarboxylic acid; $R^4$ shows a hydrogen atom residue, a monoamine residue or a monoisocyanate residue; and n indicates integers of 0 through 5.

The above-described $R^1$ and $R^2$ are independently aliphatic, alicyclic or aromatic hydrocarbon groups. The above-described $R^3$ is tetravalent aliphatic, alicyclic or aromatic hydrocarbon group in which two adjacent carbon atoms form an imide ring. The above-described $R^1$, $R^2$, and $R^3$ are an aromatic hydrocarbon group. In the chemical formula (1) or the chemical formula (2), n=0.

The thickener further contains a urea compound in addition to the above-described compound. The urea compound is an aromatic urea compound.

In a method of the present invention of producing a thickener, a step of obtaining the compound shown by the chemical formula (1) or the compound shown by the chemical formula (2) has a step of allowing a reaction to be made between an acid anhydride compound and an amino compound or a step of allowing a reaction to be made between the acid anhydride compound and an isocyanate compound. In the compound shown by the chemical formula (1) or the compound shown by the chemical formula (2), n is zero. The compound shown by the chemical formula (1) is produced by a reaction between a diisocyanate and an acid anhydride or a reaction between a monoisocyanate and an acid dianhydride compound.

The above-described reactions are made in a presence of an amine-based catalyst. The amine-based catalyst is a diamine.

The grease of the present invention contains the thickener of the present invention. The base oil of the grease is at least one selected from among an ether oil, an ester oil, an ionic liquid, a poly-α-olefin oil (hereinafter referred to as PAO oil), and a mineral oil.

10 to 60 wt % of the thickener is contained in the entire grease.

In a method of the present invention of producing grease, Material components of the compound shown by the chemical formula (1) or material components of the compound shown by the chemical formula (2) are allowed to react with each other in the base oil to form the grease or the base oil and powders of the thickener are mixed with each other to form the base oil into the grease.

Grease composed of the base oil containing the thickener of the present invention is packed in a bearing of the present invention.

Effect of the Invention

Because the compound shown by the chemical formula (1) or the chemical formula (2) (hereinafter referred to as merely an "imide compound" in the present specification) is used as the thickener of the grease of the present invention, it is possible to improve the high-temperature and high-speed durability of the bearing in which the grease is packed. Therefore the grease of the present invention is capable of improving the high-temperature and high-speed durability over the conventional grease containing only the diurea compound as its thickener.

The thickener composed of the combination of the imide compound and the urea compound is capable of thickening the base oil more easily than a thickener consisting of the imide compound, thus decreasing the concentration of the thickener in the grease. Therefore the thickener of the present invention is capable of increasing the amount of the base oil in the grease and allows the grease to have a long life.

Because the grease of the present invention is packed in the rolling bearing, the rolling bearing is excellent in the high-temperature and high-speed durability thereof. Therefore it is possible to preferably utilize the rolling bearing for motors, of home electric appliances and industrial equipments, which are used in recent years in the condition of a high-temperature and high-speed rotation.

BRIEF DESCRIPTION OF THE DRAWINGS

FIG. 1 is a sectional view of a deep groove ball bearing.

MODE FOR CARRYING OUT THE INVENTION

Aromatic polyimide resin known as Vespel (commercial name, produced by DuPont Corporation) is a synthetic resin excellent in its heat resistance. As a result of the preparation of lubricating grease by using powders of the aromatic polyimide resin as a thickener, the aromatic polyimide resin peeled off a base oil and thus does not perform a thickening function. But it has been found that compounds equivalent to an oligomer of polyimide resin containing a cyclic imide bond in its molecule performs the thickening function without peeling off the base oil. The present invention is based on this finding.

The imide compound of the thickener of the present invention is shown by a chemical formula (1) or a chemical formula (2).

[Chemical formula 2]

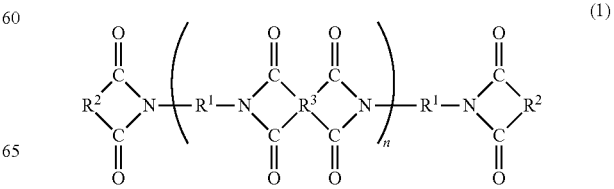

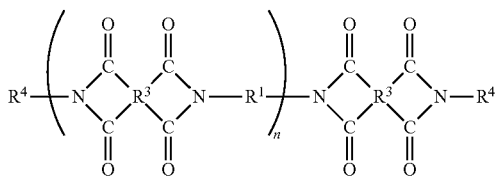
(2)

In the chemical formulas (1) and (2), $R^1$ shows a diamine residue or a diisocyanate residue. It is preferable that the diamine and the diisocyanate are aliphatic, alicyclic or aromatic.

As the aliphatic diamine, methylenediamine, ethylenediamine, propylenediamine, butylenediamine, pentylenediamine, hexylenediamine, heptylenediamine, octyldiamine, bis(2-aminoethoxy)ethane, N,N-bis(3-aminopropyl)methylamine, 2,2'-diaminodiethyl disulfide, 1,3-diamino-2-hydroxypropane, and isomers of these aliphatic diamines are listed.

As the alicyclic diamine and other diamines, morpholinediamine, 1,3-bis(3-aminomethyl)cyclohexane, 4,4'-diamino-dicyclohexyl-methane, 1,4-bis(3-aminopropyl)piperazine, 3,4-bis(3-aminopropyl) 2,4,8,10-tetraoxa[5,5] undecane, diaminosiloxane, trans-1,4-diaminocyclohexane, 3(4),8(9)-bis(aminoethyl)tricyclo[5,2,1,0]decane, and isomers of these diamines are listed.

As the aromatic diamine, an aromatic monocyclic diamine such as phenylenediamine, methylphenylenediamine, dimethylphenylenediamine, ethylphenylenediamine; and aromatic bicyclic diamine such as diaminobiphenyl, diaminodimethylbiphenyl, bis(aminophenyl)methane, bis(aminophenyl)ether, bis(aminophenyl)propane, bis(aminophenyl)butane, bis(aminophenyl)ether, bis(aminophenyl)sulfide, and bis(aminophenyl)sulfone are listed. These aromatic diamines may be substituted.

The diisocyanate is easily obtained as derivatives of the diamines by carrying out a known method of making a reaction between the diamines and phosgene.

It is preferable that the diamine and the diisocyanate which can be used in the present invention are aromatic because they improve the heat resistance of grease. Of the aromatic diamines and diisocyanates, the phenylenediamine, the methylphenylenediamine, the diaminobiphenyl, the bis(aminophenyl)methane, the bis(aminophenyl)ether, the bis(aminophenyl)sulfide, the bis(aminophenyl)sulfone, and the diisocyanate derivatives of these substances are listed as preferable examples.

$R^2$ shows a residue of a dicarboxylic acid in which two adjacent carbon atoms form an imide ring or residues of derivatives of the dicarboxylic acid. A carboxyl group is bonded to each of the two adjacent carbon atoms. The carboxyl groups react with one amino group of the diamines or one isocyanate group of the diisocyanates to form the imide ring.

As the dicarboxylic acid, succinic acid, maleic acid, phthalic acid, naphthalene dicarboxylic acid, and derivatives of these dicarboxylic acids. As the derivatives, acid anhydrides, esters, acid halides are listed.

$R^3$ shows a tetracarboxylic acid residue or residues of derivatives thereof.

As the tetracarboxylic acid, pyromellitic acid, 3,3',4,4'-benzophenon tetracarboxylic acid, 3,3,4,4'-biphenyltetracarboxylic acid, 1,2,5,6-naphthalenetetracarboxylic acid, 2,3,5,6-pyridinetetracarboxylic acid, 1,4,5,8-naphthalenetetracarboxylic acid, 3,4,9,10-perylenetetracarboxylic acid, 4,4'-sulfonyldiphthalic acid, m-terphenyl-3,3',4,4'-tetracarboxylic acid, 4,4'-oxydiphthalic acid, 1,1,1,3,3,3-hexafluoro-2,2-bis(2,3- or 3,4-dicarboxyphenyl)propane, 2,2-bis(2,3- or 3,4-dicarboxyphenyl) propane, 2,2-bis[4-(2,3- or 3,4-dicarboxyphenoxy)phenyl] propane, 1,1,1,3,3-hexafluoro-2,2-bis[4-(2,3- or 3,4-dicarboxyphenoxy)phenyl]propane, 1,3-bis(3,4-dicarboxyphenyl)-1,1,3,3-tetramethyldisioxane, butanetetracarboxylic acid, bicyclo-[2,2,2]-octo-7-en-2,3,5,6-tetracarboxylic acid are listed.

As derivatives of these acids, dianhydrides to be obtained by dehydration of two adjacent carboxyl groups, an ester of the carboxyl group, and acid halides are listed. The dianhydrides which easily generates the imide ring are preferable.

$R^4$ shows a hydrogen atom residue, a monoamine residue or a monoisocyanate residue. As the monoamine, methylamine, ethylamine, propylamine, butylamine, pentylamine, hexylamine, heptylamine, octylamine, aniline, toluidine, dodecylaniline, cyclohexylamine, cycloheptylamine, and aminodiphenyl ether are listed. The monoisocyanate is easily obtained as derivatives of the amines by carrying out a known method of making a reaction between the amines and the phosgene with each other.

The compound shown by the chemical formula (1) can be obtained by using the following methods:

(i) A reaction is made between one mole of a diamine shown by $H_2NR^1NH_2$ and two moles of a dicarboxylic acid anhydride shown by $R^2(CO)_2O$ in an organic solvent or in the base oil of grease. Instead of the diamine, $OCNR^1NCO$ can be used. In this case, the compound to be obtained in this case is n=0 in the chemical formula (1).

(ii) A reaction is made between one mole of a tetracarboxylic acid dianhydride shown by $O(CO)_2R^3(CO)_2O$ and two moles of the diamine shown by $H_2NR^1NH_2$ to obtain an imide ring-containing compound having a terminal amino group. A reaction is made between one mole of the compound having the terminal amino group and two moles of the dicarboxylic acid anhydride shown by $R^2(CO)_2O$ in the organic solvent or in the base oil of the grease. The compound to be obtained in this case is n=1 in the chemical formula (1).

By sequentially obtaining reaction products at varied mole ratios among the tetracarboxylic acid dianhydride, the dicarboxylic acid anhydride, and the diamine, the compounds having n=2 through 5 in the chemical formula (1) are obtained. Instead of the diamine, $OCNR^1NCO$ can be used.

The compound shown by the chemical formula (2) can be obtained by a method described below.

(iii) A reaction is made between one mole of the tetracarboxylic acid dianhydride shown by $O(CO)_2R^3(CO)_2O$ and two moles of a monoamine shown by $R^4NH_2$ in the organic solvent or in the base oil of the grease. Instead of the monoamine, a monoisocyanate $R^4NCO$ can be used. The compound to be obtained in this case is n=0 in the chemical formula (2).

(iv) A reaction is made between two moles of the tetracarboxylic acid dianhydride shown by $O(CO)_2R^3(CO)_2O$ and one mole of the diamine shown by $H_2NR^1NH_2$ to obtain an imide ring-containing compound having a terminal carboxylic acid anhydride group. A reaction is made between one mole of the compound having the terminal carboxylic acid anhydride group and two moles of a monoamine shown by $R^4NH_2$ in the organic solvent or in the base oil of the grease. The compound to be obtained in this case is n=1 in the chemical formula (2).

By sequentially obtaining reaction products at varied mole ratios among the tetracarboxylic acid dianhydride, the diamine, and the monoamine, the compounds having n=2 through 5 in the chemical formula (2) are obtained. Instead of the diamine, OCNR¹NCO can be used. Instead of the monoamine, R⁴NCO can be used.

In the compound shown by the chemical formula (1) or the compound shown by the chemical formula (2), it is preferable that n is zero. When n is zero, the compound can be easily synthesized, and a thickening effect can be easily obtained by adding the compound to the base oil.

In making the above-described reactions in the organic solvent, as the organic solvent, it is possible to preferably use a polar solvent such as diethyl ether, diisobutyl ether, tetrahydrofuran, methyl cellosolve, halogenated methane, dimethylformamide, dimethylacetamide, N-methyl-2-pyrrolidone, dimethylaniline, and dimethylsulfoxide. It is also possible to use the base oil of grease to be described later as the solvent.

The reaction condition and the operation method are not limited specifically, but it is possible to use a condition in which the compound shown by the chemical formula (1) or the compound shown by the chemical formula (2) can be generated or a condition in which intermediates of the compound shown by the chemical formula (1) or the compound shown by the chemical formula (2) can be generated. The imide ring is generated to form the compound shown by the chemical formula (1) or the compound shown by the chemical formula (2) via intermediates shown by chemical formulas (3) and (4) shown below.

[Chemical formula 3]

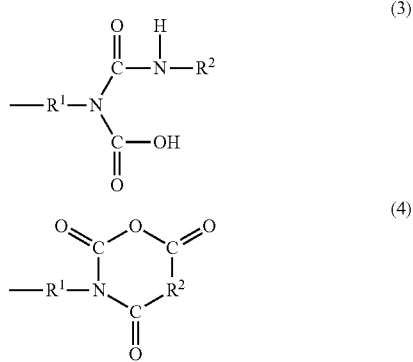

The chemical formulas (3) and (4) show an intermediate generated at the time of a reaction between the acid anhydride and the amine and an intermediate generated at the time of a reaction between the acid anhydride and the isocyanate respectively. The thickener of the present invention may contain the intermediates.

By dissolving the acid anhydride and the amine or the isocyanate in an appropriate solvent or the base oil and allowing the components to react with each other at a reaction temperature of −10 to 200° C. for one to five hours, the compound shown by the chemical formula (1) or the compound shown by the chemical formula (2) is obtained.

To prevent a reactive free radical from being left in the synthesis of the compound shown by the chemical formula (1) or the compound shown by the chemical formula (2), it is preferable to mix the isocyanate group of the isocyanate compound and the carboxylic acid anhydride group of the acid anhydride with each other in almost an equivalent amount. In adding the thickener to the base oil, the isocyanate and the acid anhydride may be allowed to react with each other in the base oil or the thickener synthesized in advance may be mixed with the base oil. A preferable production method is the former method capable of keeping the stability of the grease.

The above-described reactions are accelerated by the presence of a reaction catalyst. It is particularly preferable to use the reaction catalyst in the reaction between the isocyanates and the acid anhydrides. An amine-based catalyst is preferable as the catalyst for the reaction between the isocyanates and the acid anhydrides. The diamine is preferable as the amine-based catalyst. As the diamine, triethylenediamine and tetraethylenediamine are exemplified.

The urea compound contained in the thickener of the present invention is used in combination with the imide compound as necessary. By using the urea compound in combination with the imide compound, it is possible to maintain the heat resistance of the thickener and improve its thickening function.

As the urea compound which can be used in the present invention, a diurea compound, a triurea compound, a tetraurea compound, and polyurea compounds are listed.

The urea compound is obtained by a reaction between a polyisocyanate and the monoamine. As in the case of the synthesis of the imide compound, to prevent a reactive free radical from being left in the synthesis of the urea compound, it is preferable to mix the isocyanate group of the isocyanate compound and the amino group of the amine compound with each other in almost an equivalent amount. In adding the thickener to the base oil, it is possible to produce the urea compound by the reaction between the polyisocyanate and the monoamine.

As the polyisocyanate, phenylene diisocyanate, tolylene diisocyanate, diphenyl diisocyanate, diphenylmethane diisocyanate, octadecane diisocyanate, decane diisocyanate, and hexane diisocyanate are listed.

As the monoamine, an aliphatic monoamine, an alicyclic monoamine, and an aromatic monoamine are listed. As the aliphatic monoamine, hexylamine, octylamine, dodecylamine, hexadecylamine, octadecylamine, stearylamine, and oleylamine are listed. As the alicyclic monoamine, cyclohexylamine and the like are exemplified. As the aromatic monoamine, aniline and p-toluidine are exemplified.

To provide the excellent heat resistance of the imide compound to be used in combination with the urea compound, of the above-described urea compounds, it is especially preferable to use an aromatic urea compound obtained by a reaction between an aromatic diisocyanate used as the polyisocyanate and the aromatic monoamine used as the monoamine.

The thickener of the present invention essentially contains the imide compound and the urea compound as necessary and can be used to thicken the base oil. The grease containing the thickener is the grease of the present invention.

The thickener of the present invention containing the imide compound and the urea compound is obtained by mixing both compounds with each other, after both compounds are obtained. It is also possible to allow material components of both compounds to react with each other in the respective base oils to obtain grease containing the imide compound as its thickener and grease containing the urea compound as its thickener and mix the greases with each other. Thereby it is possible to obtain grease containing the imide compound and the urea compound as its thickener. In addition, it is possible to mix one compound synthesized in advance with the grease containing the other compound as its thickener. The method of synthesizing both compounds in the respective base oils and mixing both compounds with each other after forming the greases is preferable because this method allows the stability of the grease to be kept easily.

As the base oil of the grease of the present invention, it is possible to use a mineral oil, a synthetic hydrocarbon oil, an ester oil, an ether oil, an ionic liquid, a silicone oil, and a fluorine oil.

As the mineral oil which can be used in the present invention, lubricating oil obtained from crude oil is refined by reduced-pressure distillation, deasphalting, solvent extraction, hydrogenolysis, solvent dewaxing, cleaning of sulfuric acid, refinement of white earth, and hydrogenation refining.

As the synthetic hydrocarbon oil which can be used in the present invention, aliphatic hydrocarbon oils are favorable. Of the aliphatic hydrocarbon oils, a RAO oil and copolymers of α-olefin and olefin are more favorable. These aliphatic hydrocarbon oils have a structure in which hydrogen is added to the terminal double bond of an oligomer such as the α-olefin which is a low polymer. It is possible to use polybutene which is a kind of the PAO oil. The polybutene can be produced by polymerizing a starting material containing isobutylene as its main component by using a catalyst such as aluminum chloride. The polybutene may be used as it is or by hydrogenating it.

The ester oil which can be used in the present invention is a compound which has an ester group in its molecule and is liquid at a room temperature. As preferable ester oils, aromatic ester oil and polyol ester oil are exemplified.

Compounds to be obtained by reactions between higher alcohols and aromatic polybasic acids or derivatives thereof are preferable as the aromatic ester oil. As the aromatic polybasic acid, aromatic tricarboxylic acids such as trimellitic acid, biphenyl tricarboxylic acid, and naphthalene tricarboxylic acid; aromatic tetracarboxylic acids such as pyromellitic acid, biphenyl tetracarboxylic acid, benzophenone tetracarboxylic acid, and naphthalene tetracarboxylic acid; and derivatives of these acid anhydrides. As the higher alcohol, aliphatic monovalent alcohols such as octyl alcohol and decyl alcohol whose carbon number is not less than four are preferable. As examples of the aromatic ester oil, trioctyl trimellitate, tridecyl trimellitate, and tetraoctyl pyromellitate are listed.

As the polyol ester oil, compounds having a plurality of ester groups in the molecule thereof obtained by reactions between polyol and monobasic acids are preferable. The monobasic acids to be reacted with the polyol may be used singly or as a mixture. In the case of oligoester, dibasic acids may be used. As the polyol, trimethylolpropane, pentaerythritol, dipentaerythritol, neopentyl glycol, 2-methyl-2-propyl-1,3-propanediol are listed. As the monobasic acid, monovalent fatty acids whose carbon number is 4 to 18 are exemplified. For example, valeric acid, caproic acid, caprilic acid, enanthic acid, pelargonic acid, capric acid, undecane acid, lauric acid, myristic acid, palmitic acid, beef tallow acid, stearic acid, caproleic acid, undecylenic acid, linderic acid, tsuzuic acid, fizetelinic acid, myristoleic acid, palmitoleic acid, petroselinic acid, oleic acid, elaidic acid, asclepinic acid, vaccenic acid, sorbic acid, linoleic acid, sabinic acid, and ricinoleic acid are listed.

As the ether oil which can be used in the present invention, polyphenyl ether oil, alkyl diphenyl ether oil, dialkyl diphenyl ether oil, alkyl triphenyl ether oil, alkyl tetraphenyl ether oil, and dialkyl diphenyl ether oil are listed.

The ionic liquid which can be used in the present invention is obtained as the combination of a cation component and an anion component. As the cation component, an aliphatic amine cation or an alicyclic amine cation, an imidazolium cation, and a pyridine cation are listed. As the anion component, halide ions, $SCN^-$, $BF_4^-$, $ClO_4^-$, $PF_6^-$, $(CF_3SO_2)_2N^-$, $(CF_3CF_2SO_2)_2N^-$, $CF_3SO_3^-$, $CF_3COO^-$, $Ph_4B^-$, $(CF_3SO_2)_3C^-$, and $PF_3(C_2F_5)_3^-$ are listed. Of these anion and cation components, it is preferable to use the imidazolium cation as the cation component and $(CF_3SO_2)_2N^-$ (bis-trifluoromethylsulfonyl-imide anion) and $PF_3(C_2F_5)_3^-$ (tri(pentafluoroethyl)-trifluorophosphide anion) as the anion component, because these cation and anion components are excellent in the heat resistance, low-temperature fluidity, and environmental adaptability thereof.

As commercially available ionic liquids, OMI-TFSI, produced by Merck & Co., Inc., in which the cation component consists of 1-octyl-3-methylimidazolium cation and the anion component consists of bis-trifluoromethylsulfonyl-imide anion; HMI-TFSI, produced by Merck & Co., Inc., in which the cation component consists of 1-hexyl-3-methylimidazolium cation and the anion component consists of the bis-trifluoromethylsulfonyl-imide anion; and HMI-PF$_3$(C$_2$F5)$_3^-$, produced by Merck & Co., Inc., in which the cation component consists of the 1-hexyl-3-methylimidazolium cation and the anion component consists of trifluoro-tri(pentafluoroethyl)phosphide anion are listed.

As the above-described base oils of the grease of the present invention, it is preferable to use at least one oil selected from among the ether oil, the ester oil, and the ionic liquid, because these oils are excellent in the durability thereof at high-temperature and high-speed durability. It is also preferable to use at least one oil selected from among the ether oil, the PAO oil, and the mineral oil, because these oils are excellent in the heat resistance thereof. It is difficult to thicken the ether oil, the PAO oil, and the mineral oil by using only the imide compound. But by using the imide compound and the urea compound in combination as the thickener, it is possible to thicken these oils easily and decrease the concentration of the entire thickener in the grease.

The entire amount of the thickener in the entire grease is favorably 10 to 60 wt % and more favorably 10 to 50 wt %. When the amount of the thickener is less than 10 wt %, the grease softens and is liable to leak. Thus it is difficult to enclose the grease in a bearing. On the other hand, when the entire amount of the thickener exceeds 60 wt %, the grease hardened and there is a fear that the grease is of no practical use in packing it in the bearing.

In using the imide compound and the urea compound in combination as the thickener, the mixing ratio of the amount of the imide compound to the entire amount of the grease is favorably 10 to 50 wt % and more favorably 10 to 40 wt %. When the mixing ratio of the imide compound is less than 10 wt %, there is a fear that the thickener is short of heat resistance. On the other hand, when the mixing ratio of the imide compound exceeds 50 wt %, the mixing amount of the urea compound decreases relatively and thus there is a fear that the thickening property cannot be sufficiently improved.

In using the imide compound and the urea compound in combination as the thickener, the mixing ratio of the amount of the urea compound to the entire amount of the grease is favorably 2 to 20 wt % and more favorably 4 to 16 wt %. When the mixing ratio of the urea compound is less than 2 wt %, there is a fear that the thickening property cannot be sufficiently improved. On the other hand, when the mixing ratio of the urea compound exceeds 20 wt %, the mixing amount of the imide compound decreases relatively and thus there is a fear that the thickener is short of heat resistance.

The grease of the present invention is capable of containing amine-based and phenol-based antioxidants as necessary. As such antioxidants, alkylated diphenylamines such as p,p'-dioctyldiphenylamine, N,N'-diisopropyl-p-phenylenediamine, N,N'-di-sec-butyl-p-phenylenediamine, phenyl-1-naphtylamine, phenyl-2-naphtylamine, diphenyl-p- phenylenediamine, dipyridylamine, oleylamideamine, phenothiazine, N-methylphenothiazine, N-ethylphenothiazine, 3,7-dioctylphenothiazine, zinc alkyl dithiophosphate, dilauryl thiodipropionate, distearyl thiodipropionate, dimyristyl thiodipropionate, and ditridecyl thiodipropionate are listed. The grease of the present invention is also capable of containing sodium sebacate as the antioxidant.

The grease of the present invention is capable of containing known additives to enhance its performance other than the antioxidant. As the other additives, extreme pressure agents such as chlorine-based, sulfur-based, and phosphorous-based compounds, and organic molybdenum; a rust proof agent such as petroleum sulfonate, dinonylnaphthalene sulfonate, and sorbitan ester; a metal deactivator such as benzotriazole; a viscosity index improver such as polymethacrylate, polyisobutylene, and polystyrene are listed. These additives can be added to the base oil singly or in combination of not less than two kinds thereof.

FIG. 1 shows an example of the grease-packed bearing of the present invention. FIG. 1 is a sectional view of a deep groove ball bearing. A grease-packed bearing 1 has an inner ring 2 having an inner ring rolling surface 2a on its outer peripheral surface, an outer ring 3 concentric with the inner ring 2 and having an outer ring rolling surface 3a on its inner peripheral surface. A plurality of rolling elements 4 is disposed between the inner ring rolling surface 2a and the outer ring rolling surface 3a. A plurality of the rolling elements 4 is held by a cage 5. A sealing member 6 is fixed to the outer ring 3. A grease 7 of the present invention is packed inside the bearing 1 at least at the periphery of each rolling element 4.

EXAMPLES

Although the examples of the present invention are further described below, the present invention is not restricted thereby.

Example 1

Grease was produced by using materials of the base oil and those of the thickener at the mixing ratio shown in table 1. As shown at the lower portion of table 1, as the ether oil, MORESCO-HILUBE LS150 (150 mm$^2$/s (40° C.)) produced by Matsumura Oil Research Corporation was used. As the ester oil, HATCOL H3855 (148 mm$^2$/s (40° C.)) produced by HATCO Corporation Was used. As the ionic liquid, OMI-TFSI (91 mm$^2$/s (20° C.)) produced by Merck & Co., Inc. was used.

MDI (diphenylmethane-4,4'-diisocyanate) and phthalic anhydride were dissolved in a solution containing acetone and dimethylacetamide. Thereafter triethylenediamine was added to the solution as a catalyst. The mixing amount of the phthalic anhydride was twice that of the MDI in a mole ratio.

A reaction was made in the mixed solution at 50° C. for 24 hours. After the obtained reaction produced was washed with a large amount of acetone, it was dried to obtain a powdery compound. As a result of an infrared spectroscopic analysis, the absorption of infrared rays based on an imide ring was recognized at about 1780 cm$^{-1}$.

After the whole amount of the obtained powdery compound was added to 50 g of the ether oil and the solution was stirred, the compound was fed to a roll mil to obtain semi-solid grease. Table 1 shows the result of measurement of the worked penetration of the obtained grease. A high-temperature and high-speed durability test shown below was conducted. Table 1 shows the result.

Examples 2 through 6

Grease of each example was produced by using materials of the base oil and those of the thickener at the mixing ratios shown in table 1.

The MDI and acid anhydride were heated in the base oil to dissolve the MDI and the acid anhydride therein. Thereafter the triethylenediamine or tetraethylenediamine was added to the base oil as a catalyst. The mixing amount of the acid anhydride was twice that of the MDI in a mole ratio.

A reaction was made in the base oil solution at 90 to 150° C. for 10 hours. Generated base grease was fed to the roll mill to obtain semi-solid grease. In the example 5, after sodium sebacate serving as an antioxidant was added to the grease and the solution was stirred, generated base grease was fed to the roll mill. Table 1 shows the result of measurement of the worked penetration of each of the obtained greases. The high-temperature and high-speed durability test shown below was conducted. Table 1 shows the results.

Example 7

Grease was produced by using materials of the base oil and those of the thickener at the mixing ratio shown in table 1.

After 21.9 g of DDE (4,4'-diaminodiphenyl ether) was dissolved in 100 g of a dimethylacetamide solvent, the solution was cooled to 0° C. Thereafter 11.9 g of powdery PMDA (pyromellitic acid anhydride) was added to the solution to obtain a transparent solution. The mixing amount of the DDE was twice that of the PMDA in a mole ratio. After 16.2 g of the phthalic anhydride was added to the transparent solution, the transparent solution was sufficiently stirred. Thereafter the temperature of the solution was raised to 120° C. at which a reaction was made for one hour to obtain a deposit. After the deposit was washed with a large amount of acetone and dried, a powdery compound was obtained. As a result of the infrared spectroscopic analysis, the absorption of infrared rays based on an imide ring was recognized at about 1780 cm$^{-1}$.

After the whole amount of the obtained powdery compound was added to 50 g of the ether oil, the compound was fed to the roll mil to obtain semi-solid grease. Table 1 shows the result of measurement of the worked penetration of the obtained grease. The high-temperature and high-speed durability test shown below was conducted. Table 1 shows the result.

Example 8

Grease was produced by using materials of the base oil and those of the thickener at the mixing ratio shown in table 1.

The DDE and the phthalic acid anhydride were heated in the base oil to melt them therein. The mixing amount of the phthalic anhydride was twice that of the DDE in a mole ratio. A reaction was made in the base oil solution at 90 to 150° C. for 10 hours. Generated base grease was fed to the roll mill to obtain semi-solid grease. Table 1 shows the result of measurement of the worked penetration of the obtained grease. The high-temperature and high-speed durability test shown below was conducted. Table 1 shows the result.

Example 9

Grease was produced by using materials of the base oil and those of the thickener at the mixing ratio shown in table 1.

After 28.2 g of p-dodecylaniline was dissolved in 100 g of a dimethylacetamide solution, the solution was cooled to 0° C. Thereafter 11.8 g of powdery PMDA was added to the solution to obtain a transparent solution. The mixing amount of the p-dodecylaniline was twice that of the PMDA in a mole ratio. Thereafter the temperature of the solution was raised to 120° C. at which a reaction was made for one hour to obtain a deposit. After the deposit was washed with a large amount of acetone and dried, a powdery compound was obtained. As a result of the infrared spectroscopic analysis, the absorption of infrared rays based on an imide ring was recognized at about 1780 cm$^{-1}$.

After the whole amount of the obtained powdery compound was added to 60 g of the ether oil, the compound was fed to the roll mil to obtain semi-solid grease. Table 1 shows the result of measurement of the worked penetration of the obtained grease. The high-temperature and high-speed durability test shown below was conducted. Table 1 shows the result.

Examples 10 through 12

Grease of each example was produced by using materials of the base oil and those of the thickener at the mixing ratios shown in table 1.

The PMDA and the monoamine were heated in the base oil to melt them therein. The mixing amount of the monoamine was twice that of the PMDA in a mole ratio. A reaction was made in the base oil solution at 90 to 150° C. for 10 hours. Each of generated base grease was fed to the roll mill to obtain semi-solid grease. Table 1 shows the result of measurement of the worked penetration of each of the obtained greases. The high-temperature and high-speed durability test shown below was conducted. Table 1 shows the results.

Comparative Examples 1 through 3

Grease of each comparative example was produced by using materials of the base oil and those of the thickener at the mixing ratios shown in table 1.

After heating the MDI to dissolve it in the half of the base oil to obtain a solution, p-toluidine dissolved by heating it in another half of the base oil was added to the solution. The mixing amount of the p-toluidine was twice that of the MDI in a mole ratio.

Each of generated base greases was fed to the roll mill to obtain semi-solid grease. Table 1 shows the result of measurement of the worked penetration of each of the obtained greases. The high-temperature and high-speed durability test shown below was conducted. Table 1 shows the results.

<High-Temperature and High-Speed Durability Test>

After 1.8 g of the grease of each of the examples and the comparative examples was packed inside rolling bearings [dimension of bearing: (inner diameter: 20 mm, outer diameter: 47 mm, width: 14 mm)], the rolling bearings were rotated at 10,000 rpm under conditions in which the temperature of the outer-diameter portion of the outer ring was 180° C., 200° C., and radial and axial loads were 67N. The period of time till each rolling bearing was seized was measured (period of time (hour)).

TABLE 1

Unit of mixing amount: part by weight

| | Example | | | | | | | |
|---|---|---|---|---|---|---|---|---|
| | 1 | 2 | 3 | 4 | 5 | 6 | 7 | 8 |
| Base oil | | | | | | | | |
| Ether oil[1] | 50 | 50 | 50 | — | — | 50 | 50 | 50 |
| Ester oil[2] | — | — | — | 50 | — | — | — | — |
| Ionic liquid[3] | — | — | — | — | 70 | — | — | — |
| Thickener | | | | | | | | |
| p-toluidine | — | — | — | — | — | — | — | — |
| p-butylaniline | — | — | — | — | — | — | — | — |
| DDE | — | — | — | — | — | — | 21.9 | 20.2 |
| Phthalic acid anhydride | 27.1 | 27.1 | 27.1 | 27.1 | 16.3 | — | 16.2 | 29.8 |
| p-dodecylaniline | — | — | — | — | — | — | — | — |
| Succinic acid anhydride | — | — | — | — | — | 22.2 | — | — |
| PMDA | — | — | — | — | — | — | 11.9 | — |
| MDI[4] | 22.9 | 22.9 | 22.9 | 22.9 | 13.7 | 27.8 | — | — |
| Solvent | | | | | | | | |
| Acetone | 100 | — | — | — | — | — | — | — |
| Dimethylacetamide | — | — | — | — | — | — | 100 | — |
| Reaction catalyst | | | | | | | | |
| Triethylenediamine | 5 | 5 | — | 5 | 5 | 5 | — | — |
| Tetraethylenediamine | — | — | 5 | — | — | — | — | — |
| Additive | | | | | | | | |
| Sodium sebacate | — | — | — | — | 3 | — | — | — |
| Properties of grease | | | | | | | | |
| Worked penetration (JIS K2220) | No. 1 | No. 1 | No. 1 | No. 2 | No. 2 | No. 1 | No. 1 | No. 1 |
| High-temperature and high-speed test (180° C.), h | — | — | — | — | Over 1000 | — | — | — |
| High-temperature and high-speed test (200° C.), h | 300 | 310 | 300 | 420 | — | 230 | 290 | 280 |

TABLE 1-continued

Unit of mixing amount: part by weight

|  | Example | | | | Comparative example | | |
|---|---|---|---|---|---|---|---|
|  | 9 | 10 | 11 | 12 | 1 | 2 | 3 |
| Base oil | | | | | | | |
| Ether oil[1] | — | — | — | — | 80 | — | — |
| Ester oil[2] | 60 | 60 | 60 | 50 | — | 80 | — |
| Ionic liquid[3] | — | — | — | — | — | — | 70 |
| Thickener | | | | | | | |
| p-toluidine | — | — | — | 24.8 | 9.2 | 9.2 | 13.8 |
| p-butylaniline | — | — | 23.1 | — | — | — | — |
| DDE | — | — | — | — | — | — | — |
| Phthalic acid anhydride | — | — | — | — | — | — | — |
| p-dodecylaniline | 28.2 | 28.2 | — | — | — | — | — |
| Succinic acid anhydride | — | — | — | — | — | — | — |
| PMDA | 11.8 | 11.8 | 16.9 | 25.2 | — | — | — |
| MDI[4] | — | — | — | — | 10.8 | 10.8 | 16.2 |
| Solvent | | | | | | | |
| Acetone | — | — | — | — | — | — | — |
| Dimethylacetamide | 100 | — | — | — | — | — | — |
| Reaction catalyst | | | | | | | |
| Triethylenediamine | — | — | — | — | — | — | — |
| Tetraethylenediamine | — | — | — | — | — | — | — |
| Additive | | | | | | | |
| Sodium sebacate | — | — | — | — | — | — | 3 |
| Properties of grease | | | | | | | |
| Worked penetration (JIS K2220) | No. 2 | No. 2 | No. 2 | No. 2 | No. 2 | No. 2 | No. 2 |
| High-temperature and high-speed test (180° C.), h | — | — | — | — | — | — | 350 |
| High-temperature and high-speed test (200° C.), h | 260 | 260 | 300 | 320 | 170 | 180 | — |

[1]MORESCO-HILUBE LS150 (produced by Matsumura Oil Research Corporation, kinetic viscosity at 40° C.: 150 mm$^2$/s)
[2]HATCOL H3855 (produced by HATCO Corporation, kinetic viscosity at 40° C.: 148 mm$^2$/s)
[3]OMI-TFSI (produced by Merck & Co., Inc., kinetic viscosity at 20° C.: 91 mm$^2$/s)
[4]MILLIONATE MT (produced by Nippon Polyurethane Industry Co., Ltd.)

As apparent from table 1, the grease of each of the examples in which the imide compound having the imide bond was used as the thickener was superior in the high-temperature and high-speed durability thereof to the grease of each of the comparative examples in which the diurea compound was used as the thickener.

Examples in which the imide compound and the urea compound were used in combination as the thickener of grease are shown below.

<Urea Grease A through C>

Urea greases A through C containing the urea compound as the thickener thereof were produced by using materials of the base oil and those of the thickener at the mixing ratios shown in table 2 and by using the following method. After heating the MDI (diphenylmethane-4,4'-diisocyanate) to dissolve it in the half of the base oil to obtain a solution, the p-toluidine dissolved by heating it in another half of the base oil was added to the solution. The mixing amount of the p-toluidine was twice that of the MDI in a mole ratio. Each of generated base greases was fed to the roll mill to obtain semi-solid greases. Table 2 shows the results of measurement of the worked penetration of each of the obtained greases.

<Imide Grease D through F>

Imide greases D through F containing the imide compound as the thickener thereof were produced by using materials of the base oil and those of the thickener at the mixing ratios shown in table 2 and by using the following method. After the MDI and the phthalic acid anhydride were heated to dissolve them in the base oil, the triethylenediamine was added thereto. The mixing amount of the phthalic acid anhydride was twice that of the MDI in a mole ratio. The mixing amount of the triethylenediamine was five parts by weight for the sum of the base oil and the thickener, namely, 100 parts by weight. A reaction was made in the base oil solution at 90 to 150° C. for 10 hours. Each of generated base greases was fed to the roll mill to obtain semi-solid greases. Table 2 shows the results of measurement of the worked penetration of each of the obtained greases.

<Imide Grease G>

An imide grease G containing the imide compound as the thickener thereof was produced by using materials of the base oil and those of the thickener at the mixing ratio shown in table 2 and by using the following method. The DDE (4,4'-diaminodiphenyl ether) and the phthalic acid anhydride were heated in the base oil to dissolve the DDE and the phthalic acid anhydride therein. The mixing amount of the phthalic acid anhydride was twice that of the DDE in a mole ratio. A reaction was made in the base oil solution at 90 to 150° C. for 10 hours. Generated base grease was fed to the roll mill to obtain semi-solid grease. Table 2 shows the result of measurement of the worked penetration of the obtained grease.

<<Imide Grease H>>

An imide grease H containing the imide compound as the thickener thereof was produced by using materials of the base oil and those of the thickener at the mixing ratio shown in table 2 and by using the following method. The PMDA (pyromellitic acid anhydride) and the p-toluidine were heated in the base oil to dissolve the PMDA and the p-toluidine therein. A reaction was made in the base oil solution at 90 to 150° C. for 10 hours to generate base grease. The generated base grease was fed to the roll mill to obtain semi-solid grease. Table 2 shows the result of measurement of the worked penetration of the obtained grease.

TABLE 2

|  | Urea grease | | | Imide grease | | | | |
|---|---|---|---|---|---|---|---|---|
|  | A | B | C | D | E | F | G | H |
| Mixing amount of grease (wt %) | | | | | | | | |
| Base oil | | | | | | | | |
| Ether oil[1] | 80 | — | — | 50 | — | — | 50 | 50 |
| PAO oil[2] | — | 80 | — | — | 50 | — | — | — |
| Mineral oil[3] | — | — | 80 | — | — | 50 | — | — |
| Thickener | | | | | | | | |
| p-toluidine | 9.2 | 9.2 | 9.2 | — | — | — | — | 24.8 |
| DDE | — | — | — | — | — | — | 20.2 | — |
| Phthalic acid anhydride | — | — | — | 27.1 | 27.1 | 27.1 | 29.8 | — |
| MDI[4] | 10.8 | 10.8 | 10.8 | 22.9 | 22.9 | 22.9 | — | — |
| PMDA | — | — | — | — | — | — | — | 25.2 |
| Worked penetration (JIS K2220) | No. 2 | No. 2 | No. 2 | No. 1 | No. 1 | No. 1 | No. 1 | No. 1 |

[1] MORESCO-HILUBE LS150 (produced by Matsumura Oil Research Corporation, kinetic viscosity at 40° C.: 150 mm²/s)
[2] SYNFLUID 801 (produced by Nippon Steel Chemical Co., Ltd., kinetic viscosity at 40° C.: 47 mm²/s)
[3] Vitrea oil (produced by Showa Shell Sekiyu K.K., kinetic viscosity at 40° C.: 100 mm²/s)
[4] MILLIONATE MT (produced by Nippon Polyurethane Industry Co., Ltd.)

Examples 13 through 21

A grease-like substance (mixed grease) of each example containing the urea compound and the imide compound as the thickener thereof was obtained by mixing one of the urea greases A through C and one of the imide greases D through H with each other at the mixing ratios shown in table 3. Table 3 shows the results of measurement of the worked penetration of each of the obtained mixed greases. The high-temperature and high-speed durability test shown below was conducted on each mixed grease. Table 3 shows the results.

Comparative Examples 4 through 6

The high-temperature and high-speed durability test shown below was conducted on the urea greases A through C. Table 3 shows the results.

<High-Temperature and High-speed Durability Test>

After 1.8 g of the grease of each of the examples and the comparative examples was packed inside rolling bearings [dimension of bearing: (inner diameter: 20 mm, outer diameter: 47 mm, width: 14 mm)], the rolling bearings were rotated at 10,000 rpm under conditions in which the temperature of the outer-diameter portion of the outer ring was 180° C. or 200° C., and radial and axial loads were 67N. The period of time till each rolling bearing was seized was measured (period of time (hour)).

TABLE 3

|  | Example | | | | | |
|---|---|---|---|---|---|---|
|  | 13 | 14 | 15 | 16 | 17 | 18 |
| Mixing amount of grease (wt %) | | | | | | |
| Urea grease | | | | | | |
| Grease A | 80 | 50 | 20 | 50 | — | — |
| Grease B | — | — | — | — | 50 | — |
| Grease C | — | — | — | — | — | 50 |
| Imide grease | | | | | | |
| Grease D | 20 | 50 | 80 | — | — | — |
| Grease E | — | — | — | — | 50 | — |
| Grease F | — | — | — | — | — | 50 |
| Grease G | — | — | — | 50 | — | — |
| Grease H | — | — | — | — | — | — |
| Amount of urea compound in entire grease (wt %) | 16 | 10 | 4 | 10 | 10 | 10 |
| Amount of imide compound in entire grease (wt %) | 10 | 25 | 40 | 25 | 25 | 25 |
| Amount of thickener in entire grease (wt %) | 26 | 35 | 44 | 35 | 35 | 35 |
| Properties of grease | | | | | | |
| Worked penetration (JIS K2220) | No. 2 | No. 2 | No. 1 | No. 2 | No. 1 | No. 1 |
| High-temperature and high-speed test (180° C.), h | — | — | — | — | 430 | 350 |
| High-temperature and high-speed test (200° C.), h | 400 | 530 | 440 | 510 | — | — |

|  | Example | | | Comparative example | | |
|---|---|---|---|---|---|---|
|  | 19 | 20 | 21 | 4 | 5 | 6 |
| Mixing amount of grease (wt %) | | | | | | |
| Urea grease | | | | | | |
| Grease A | — | — | 50 | 100 | — | — |
| Grease B | — | — | — | — | 100 | — |
| Grease C | 80 | 20 | — | — | — | 100 |
| Imide grease | | | | | | |
| Grease D | — | — | — | — | — | — |
| Grease E | — | — | — | — | — | — |
| Grease F | 20 | 80 | — | — | — | — |
| Grease G | — | — | — | — | — | — |
| Grease H | — | — | 50 | — | — | — |
| Amount of urea compound in entire grease (wt %) | 16 | 4 | 10 | 20 | 20 | 20 |
| Amount of imide compound in entire grease (wt %) | 10 | 40 | 25 | — | — | — |
| Amount of thickener in entire grease (wt %) | 26 | 44 | 35 | 20 | 20 | 20 |
| Properties of grease | | | | | | |
| Worked penetration (JIS K2220) | No. 1 | No. 1 | No. 2 | No. 2 | No. 2 | No. 2 |
| High-temperature and high-speed test (180° C.), h | 300 | 290 | — | — | 210 | 150 |
| High-temperature and high-speed test (200° C.), h | — | — | 470 | 170 | — | — |

As indicated in table 3, the greases of the examples in which the thickener consisting of the urea compound and the predetermined imide compound was used were superior to the greases of the comparative examples in which only the diurea compound was used as the thickener in the high-temperature and high-speed durability thereof.

INDUSTRIAL APPLICABILITY

Because the grease of the present invention contains the compound having the imide bond as the thickener thereof, the grease-packed rolling bearing of the present invention is excellent in the high-temperature and high-speed durability thereof. Therefore it is possible to preferably utilize the rolling bearing for motors, of home electric appliances and industrial equipments, which are used in recent years in the condition of a high-temperature and high-speed rotation.

EXPLANATION OF REFERENCE NUMERALS AND SYMBOLS

1: grease-packed bearing
2: inner ring
3: outer ring
4: rolling element
5: cage
6: sealing member
7: grease

The invention claimed is:

1. A thickener to be added to a grease, wherein said thickener for a grease comprising a compound shown by a chemical formula (1) shown below;
[Chemical formula 1]

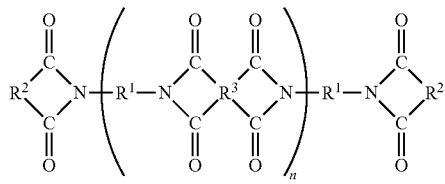

(1)

wherein said chemical formula (1), $R^1$ a diisocyanate residue; $R^2$ shows a residue of a dicarboxylic acid in which two adjacent carbon atoms form an imide ring or residues of derivative of said dicarboxylic acid; $R^3$ shows a tetracarboxylic acid residue or residues of derivatives of said tetracarboxylic acid; and n indicates integers of 0 through 5.

2. A thickener according to claim 1, wherein said $R^1$ and said $R^2$ are independently aliphatic, alicyclic or aromatic hydrocarbon groups.

3. A thickener according to claim 1, wherein said $R^3$ is tetravalent aliphatic, alicyclic or aromatic hydrocarbon group in which two adjacent carbon atoms form an imide ring.

4. A thickener according to claim 1, wherein said $R^1$, $R^2$ and $R^3$ are an aromatic hydrocarbon group.

5. A thickener according to claim 1, wherein in said chemical formula (1), n=0.

6. A thickener according to claim 1 further containing a urea compound in addition to said compound.

7. A thickener according to claim 6, wherein said urea compound is an aromatic urea compound.

8. A method of producing a thickener according to claim 1, wherein said step of obtaining said compound is a step of obtaining said compound shown by said chemical formula (1) and has a step of allowing a reaction to be made between a diisocyanate and an acid anhydride.

9. A method of producing a thickener according to claim 8, wherein said reactions are made in a presence of an amine-based catalyst.

10. A method of producing a thickener according to claim 9, wherein said amine-based catalyst is a diamine.

11. Grease containing a thickener in a base oil thereof, wherein said thickener is as claimed in claim 1.

12. Grease according to claim 11, wherein said base oil of said grease is at least one selected from among an ether oil, an ester oil, an ionic liquid, a poly-.alpha.-olefin oil, and a mineral oil.

13. Grease according to claim 11, wherein 10 to 60 wt % of said thickener is contained in a whole amount of said grease.

14. A method of producing grease according to claim 11, wherein material components of said compound shown by said chemical formula (1) are allowed to react with each other in said base oil to form said grease.

15. A method of producing grease according to claim 11, wherein said base oil and powders of said thickener are mixed with each other to form said grease.

16. A bearing in which grease is packed, wherein said grease is as claimed in claim 11.

17. A thickener according to claim 1, wherein said diisocyanate is diphenylmethane-4, 4"-diisocyanate.

18. A thickener according to claim 1, wherein said compound shown by said chemical formula (1) is obtained by reacting said diisocyanate and an acid anhydride.

19. Grease according to claim 11 which is formed by material components of said compound shown by said chemical formula (1) being allowed to react with each other in said base oil.

* * * * *